United States Patent [19]
Ratmansky

[11] 3,816,692
[45] June 11, 1974

[54] ELECTRICAL DISCHARGE MACHINING EFFICIENCY AND SAFETY MONITORING SYSTEM

[76] Inventor: Samuel C. Ratmansky, 1706 E. Willow Grove Ave., Philadelphia, Pa. 19118

[22] Filed: Mar. 2, 1972

[21] Appl. No.: 231,215

[52] U.S. Cl............................ 219/69 C, 219/69 S
[51] Int. Cl............................................. B23k 9/16
[58] Field of Search...... 219/69 C, 69 G, 69 P, 69 S

[56] References Cited
UNITED STATES PATENTS

| | | | |
|---|---|---|---|
| 3,301,776 | 1/1967 | Hughes............................ | 219/69 C |
| 3,375,341 | 3/1968 | Richards.......................... | 219/69 C |
| 3,474,216 | 10/1969 | Morgan, Jr. ...................... | 219/69 G |
| 3,586,198 | 6/1971 | Hockenberry .................... | 219/69 C |
| 3,623,148 | 11/1971 | Berghausen................... | 219/69 C X |
| 3,632,942 | 1/1972 | Kondo.............................. | 219/69 C |
| 3,705,286 | 12/1972 | Kondo et al. .................... | 219/69 C |

*Primary Examiner*—J. V. Truhe
*Assistant Examiner*—Hugh D. Jaeger
*Attorney, Agent, or Firm*—Seidel, Gonda & Goldhammer

[57] ABSTRACT

An electrical discharge machine efficiency and safety monitoring system in which the energy dissipated or charge flow across the cutting gap of individual spark pulses, the output pulse frequency of the electrical discharge machine and the percentage of pulses of the electrical discharge machine which actually cause conduction across the cutting gap are in process measured and displayed. The results of these three measurements indicate the metal removal rate efficiency of the settings on the EDM machines, RMS surface finish of the work, size of the spark gap or overcut, depth of pitting on work, recast layer on work, size of micro-cracks on work, and may also be multiplied together manually or by means of hardware to obtain a product called the metal removal rate factor. This is indicative of the actual amount of metal removed by the EDM machining process when correlated with a reference chart, and will indicate the highest cutting efficiency possible at a given RMS finish, when compared with other settings. An alarm may also be provided to provide a signal in response to the percentage of pulses crossing the gap dropping below a predetermined minimum. Safety means in the monitoring system are provided to detect incipient and steady state arcing or burning conditions in order to signal the EDM operator to take corrective action to avoid ruining the workpiece.

17 Claims, 2 Drawing Figures

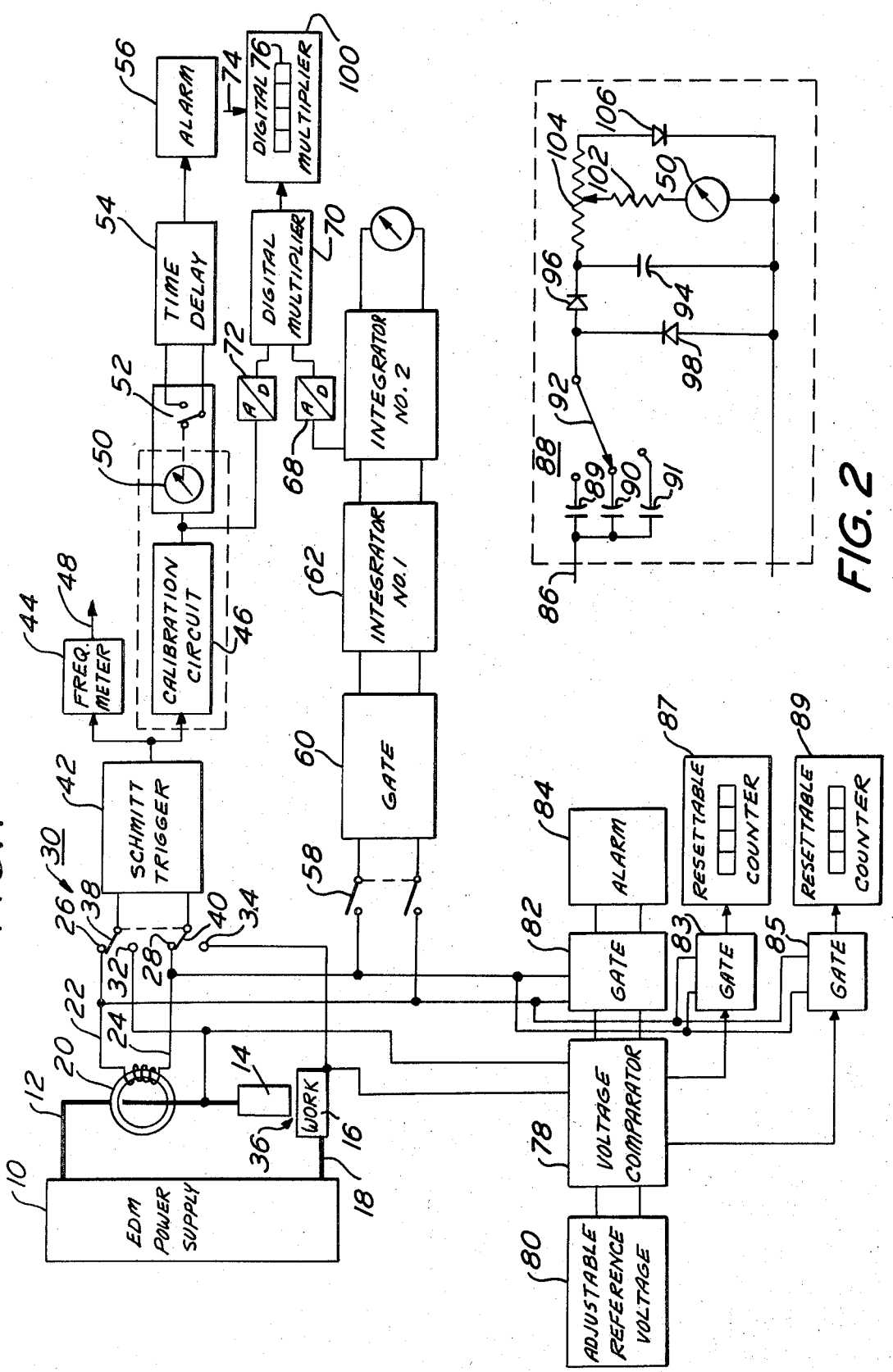

ELECTRICAL DISCHARGE MACHINING EFFICIENCY AND SAFETY MONITORING SYSTEM

The present invention relates to an electrical discharge machining efficiency and safety monitoring system. More particularly, the present invention relates to an electrical discharge machining in process efficiency and safety monitoring system in which the pulse output frequency of the electrical discharge machine, the percentage of pulses upon which conduction across the gap actually occurs, and the charge transferred across the cutting gap or the energy dissipated in individual spark pulses are in process monitored and displayed.

Heretofore, there was no available means to measure and display data to determine the actual EDM efficiency during the machining process. Also, the prior art did not provide information to determine the precise amount of metal removed per unit of time in an electrical discharge machining operation, nor did it provide warning signals of impending or actual steady state arcing conditions to enable the EDM operator to take corrective action to avoid ruining the workpiece. The operator of the electrical discharge machine was required to have a high degree of training, skill and experience in order to operate the electrical discharge machine at a usable level of efficiency and safety. Even then, it was never possible to adjust the controls of the electrical discharge machine, or the EDM dielectric fluid, with absolute certainty in order to provide the highest efficiency within the range of acceptable finishes, depth of pitting, recast layer, size of micro-cracks and EDM overcut on the machined workpiece. That is, to achieve the smoothness or finish desired on the workpiece involving the adjustment of the complicated choice of EDM control settings and dielectric fluid flushing to achieve maximum metal removal per unit of time at desired RMS finish, depth of pitting, recast layer, size of micro-cracks, and EDM overcut was not measurable in process, and was done by guesswork and experience of operator. There was also no alarm system to provide a signal to the operator if the percent of pulses crossing the gap dropped below a predetermined level.

By the use of the present invention, the efficiency of operation of the electrical discharge machine may be monitored and recorded during the machining process. These may be recorded manually from displays or the output of the monitor may be fed to recording means such as a digital print out means. The amount of metal removal per unit of time may be also in process monitored and recorded by the operator. By measuring the pulse output frequency of the electrical discharge machine, the percentage of pulses upon which conduction or arcing across the gap occurs, and the actual amount of charge crossing the gap in individual pulses, these values can be displayed, observed and recorded by the operation, and compared for a number of different control settings. Even dielectric fluid flushing variations can be compared with the displays. The results of these three measurements may be multiplied together manually or by means of hardware to obtain a product called the metal removal rate factor. The operator may compare various settings to quickly find the settings with highest metal removal rate factor, at a given individual spark pulse size, which will then give him the best results on this particular job, consistent with the desired RMS surface finish, depth of pitting, recast layer, and size of micro-cracks on the work. Therefore, by use of the present invention, an electrical discharge machine operator with a minimum of training may be enabled to operate the electrical discharge machine at the highest efficiency on any particular job with an acceptable surface finish on the machined workpiece. The operator would also be certain of having the highest degree of safety from arcing or burning on a machining operation due to safety warning means of the system that detects incipient and steady state arcing or burning conditions and gives warning signals, enabling the operator to take corrective action.

The EDM operator is not required to personally continuously monitor the meter displaying the percentage of pulses which cross the gap, as an alarm may also be provided to provide a signal upon the percentage dropping below a predetermined minimum. Therefore, there is provided an automatic efficiency monitoring function for EDM machines that alerts the operator if the efficiency drops below an acceptable level, enabling the operator to take corrective action.

In accordance with the present invention, the efficiency of an electrical discharge machining operation may be monitored. The actual number of pulses upon which conduction or arcing across a gap between an electrode and workpiece may be monitored by means of a transducer coupled to an electrical lead supplying electrical energy to the electrode. The output of the transducer may be fed to a frequency meter. Alternatively, the electrical voltage pulses applied across the gap may be applied to a frequency meter. The output voltage pulse frequency applied to the electrode may be used to set an indicator means to read 100 percent or full scale. The indicator means may then be connected to the output of the transducer which is electromagnetically coupled to the lead supplying electrical energy across the gap. The indicator means will then read the percentage of pulses upon which conduction or arcing across the gap occurs. An alarm may also be provided to provide a signal upon the percentage dropping below a predetermined minimum. This alarm signal eliminates the need for the EDM operator to visually monitor the EDM operation to be certain of a preselected level of cutting efficiency. The output of the transducer which is magnetically coupled to the lead supplying electrical energy to the electrode may also be fed to a gating network. The gating network gates or passes the signal only during intervals of time when a voltage is induced into the transducer by current flowing in the lead. Th output of the gating network is integrated in order to provide an indication of the charge or electrical energy flowing across the gap during a single pulse upon which conduction occurs. If the output of the transducer coupled to the lead provides an output proportional to the time derivative of the current flowing in the lead, it may be necessary to integrate the output of the transducer twice in order to obtain a signal proportional to the charge or energy. That is the first integration would provide a signal proportional to the current flowing in the lead, and the second integration would provide a signal proportional to the charge or energy.

In accordance with further features of the present invention, the signal output of the second integration may be read on a meter and would be an indication of current per pulse or the individual spark size, thereby enabling the EDM RMS finish, depth of pitting, recast layer, size of micro-cracks and EDM overcut or spark gap, to be determined by reference to a chart with values for the particular electrode material, electrode polarity, workpiece material, and metal removal rate factor. The signal output read on a meter for an individual spark size when multiplied by the pulsing frequency and the efficiency rate of pulses that cross the cutting gap will indicate amount of metal being removed from workpiece. Multiplication may be done manually or by hardware. This product may be called the metal removal rate factor, and when used in conjunction with charts for the proper electrode material, electrode polarity and workpiece material, may be used to determine the actual amount of metal being removed from workpiece in a given amount of time.

In accordance with the present invention, means are also provided to compare the voltage appearing across the gap with a predetermined voltage during the period of time that an electrical pulse is applied to the electrode. This voltage comparison means may also be provided with an alarm in order to give an audible or visual or pulse counting signal when the voltage across the gap drops below a predetermined minimum or percentage of the desired voltage. At one level of voltage steady state arcing or burning of workpiece is signalled, at another level of voltage incipient arcing is signalled. Resettable counters may be used to display the count of pulses at arcing or burning level and also the count of pulses at incipient arcing voltage level. Such resettable counters would enable the operator to know if either condition occurred and the operator failed to observe a visual or audible signal. The counters would also indicate to the operator the rate of pulses in incipient or steady state arcing voltage levels, enabling operator to set controls for safe machining of the workpiece as a precaution against arcing which could ruin the workpiece. The absence of any count on either resettable counter informs the operator that the job has progressed free from incipient or steady state arcing to this point in time. At the end of the machining operation, the operator may observe that no count has taken place on counters and know for certain that the workpiece has not been burned by arcing, thus a safety factor is available for the operator. This is a significant advantage since the workpiece may be covered with dirty EDM dielectric fluid and not easily inspected for arc pitting. It is also impossible for the operator to detect 'random' arcs that occur in less than one milli-second and yet leave pitting larger than the usual EDM pitting on the workpiece for a given setting by usual controls or instruments on EDM machines without this efficiency and safety monitoring system. Therefore, the system is also an inspection method for arcing damage of the workpiece which may go unobserved by the EDM operator due to the presence of either dirty EDM dielectric fluid that covers the workpiece during the EDM machining, or due to the fact that electrode covered the arc which occurs inside a cavity being EDM machined.

For the purpose of illustrating the invention, there is shown in the drawings a form which is presently preferred; it being understood, however, that this invention is not limited to the precise arrangements and instrumentalities shown.

FIG. 1 is a schematic diagram, in block diagram form, of an efficiency monitoring system in accordance with the present invention.

FIG. 2 is a schematic diagram of the circuitry of FIG. 1 enclosed in the dotted outline.

Referring now to the drawings in detail, wherein like numerals indicate like elements, there is shown in FIG. 1 an electrical discharge machine power supply 10. A lead 12 is connected to an electrode 14. Work piece 16 is connected by means of lead 18 back to the other side of power supply 10.

Transducer 20 is magnetically coupled to lead 12. Transducer 20 may be a toroidal core current detector coil which provides an output voltage proportional to the time differential of the current flowing through lead 12. The output across leads 22 and 24 is therefore a voltage proportional to the time derivative or differential of the current flowing through lead 12. This voltage is felt across switch contacts 26 and 28.

Switch 30, in addition to contacts 26 and 28, is provided with contacts 32 and 34. Contacts 32 and 34 are connected across the gap 36 formed between electrode 14 and work piece 16. Therefore, a voltage, equal to the voltage across the gap, is felt across switch contacts 32 and 34. Switch arms 38 and 40, which are connected to the input to Schmitt trigger circuit 42, may be switched between contacts 26, 28 and 32, 34. In other words, switch 30 may be switched to provide as the input to Schmidt trigger circuit 42 the output of transducer 20 or the voltage across gap 36.

The output of Schmitt trigger 42 is applied to a frequency meter 44 and to a calibration circuit 46. The frequency meter 44 counts the number of pulses per second on the output of Schmitt trigger 42. Schmitt trigger 42 may be replaced by any suitable pulse circuit which provides a single clean output pulse for each input pulse, even though the input pulses may be rather poorly shaped. That is, the output of the Schmitt trigger or other suitable pulsing circuits is a rectangular pulse having a constant amplitude and a constant pulse width for a variable and somewhat rounded input pulse wave form. Frequency meter 44 may be provided with a digital readout in order to enable the more convenient use of the data. Frequency meter 44 may also be provided with an output terminal 48 which provides an input to digital multiplier 100, to be discussed later.

Calibration circuit 46 provides the capability of an adjustment. By means of adjusting calibration circuit 46, meter 50 may be made to read full scale or 100 percent when switch 30 is connected to switch contacts 32, 34, or in other words across gap 36. That is, by adjusting calibration 46, meter 50 is made to read full scale when a pulse rate equal to the pulse rate output of power supply 10 is applied to the input of Schmitt trigger circuit 42. When switch 30 is switched to contacts 26, 28, or in other words to the output of transducer 20, meter 50 will read the percentage of pulses produced by power supply 10 upon which conduction or arcing across gap 36 occurs.

The meter 50 may be part of a conventional meter which is provided with a switch 52 actuated by means of the pointer mechanism of meter 50. When the percentage of the pulses upon which conduction occurs drops below a predetermined percentage, switch 52 is actuated by means of the movement of the pointer mechanism of meter 50. Actuation of switch 52 activates a time delay means 54. If the percentage remains below the predetermined minimum for a period of time greater than the time delay set in time delay means 54, an alarm 56 is actuated. Time delay means 54 is provided so that an alarm is not given for a momentary or very short drop in the percentage. However, if the percentage of pulses upon which conduction occurs remains low for a set period of time, the alarm 56 will be activated.

The output of transducer 20 appearing across lines 22 and 24 is also applied through switch 58 to gating means 60. Gating means 60 passes the output of transducer 20 only when there is an output voltage appearing across lines 22 and 24. The output of gate 60 is fed to the first integrator 62. The output of the first integrator 62 is proportional to the current flowing through lead 12 since transducer 20 provides an output voltage which is proportional to the time derivative of the current flowing through lead 12. The output of first integrator 62 is fed to a second integrator 64. The output of the second integrator 64 is proportional to the charge which flows through lead 12 and therefore proportional to the charge flowing across gap 36. The output of second integrator 64 may be indicated by an indicator means 66. Indicator means 66 may be a meter. Although a first integrator 62 and a second integrator 64 are shown and described, it is understood that only a single integrator need be used if a transducer were provided in place of transducer 20 which would produce an output voltage proportional to the current flowing through lead 12, rather than proportional to the time derivative of the current flowing through lead 12.

The output of second integrator 64 may also be fed through an analog to digital converter 68 to one input of a digital multiplier 70. The signal applied to meter 50 may also be fed through analog to digital converter 72 to the second input of digital multiplier 70. The product output of digital multiplier 70 is applied as one input to digital multiplier 100. A second input to digital multiplier 100 is provided at input terminal 74 from output terminal 48 of frequency meter 44. The product obtained by multiplying the digital frequency signal output of frequency meter 44, the output of calibration circuit 46 and the output of second integrator 64 may be displayed on digital readout means 76 of digital multiplier 100. The product so displayed on digital display means 76 may be used to provide an indication of the metal removal rate of the electrical discharge machining process being monitored. The product so obtained and displayed on digital display means 76 may be used in conjunction with a chart for the specific metal being machined, the type of electrode material and the polarity of the connection to the electrode. The chart is necessary because the metal removal rate varies with these factors.

The voltage appearing across the gap 36 is also applied to voltage comparator 78. A plurality of predetermined voltages are supplied from adjustable reference means 80. For example, adjustable voltage reference means 80 may be a regulated voltage supply in which a plurality of predetermined or preselected voltages are tapped from the wiper arm of a plurality of series connected potentiometers connected across the output of the regulated voltage supply. However, this is a conventional and well known method of producing a plurality of voltage levels and need not be described in detail herein.

The voltage appearing across gap 36 is compared in voltage comparator 78 with each of the predetermined voltage level outputs from adjustable reference voltage means 80. That is, voltage comparator 78 contains a plurality of voltage comparators. In the specific example being described herein, voltage comparator 78 would contain three voltage comparators. The voltage appearing across gap 36 would be compared in each of the three voltage comparators with the three voltage level outputs provided by adjustable reference voltage means 80.

The output of voltage comparator means 78 provides an output voltage to gate 82 whenever the voltage appearing across the gap 36 is less than the first predetermined voltage supplied from adjustable reference source 80. Similarly, an output voltage from voltage comparator means 78 is provided to gates 83 and 85 whenever the voltage appearing across gap 36 is less than the second and third predetermined voltage level supplied by adjustable reference voltage means 80.

The output of voltage comparator 78 is gated by means of gating means 82, 83 and 85. Gating means 82, 83 and 85 are controlled by the output of transducer 20. That is, gating means 82, 83 and 85 pass the output of voltage comparator means 78 only during the periods of time that a voltage is induced into transducer 20. The output of gating means 82 is used to activate an alarm 84. The output of gating means 82 may also be supplied to a counter, not shown. Alarm 84 is activated only if the voltage appearing across gap 36 is less than the first predetermined voltage during a period of time when gating means 82 is gated on. That is, voltage comparisons made in between pulses will not activate the alarm. This is desirable because the voltage appearing across gap 36 in the periods of time between pulses would always be less than the first predetermined voltage. The first predetermined voltage output from adjustable reference voltage means 80 may be set at some desirable voltage minimum, such as 80 percent of the usual gap voltage appearing across gap 36 under ideal conditions. Therefore, alarm 84 would be activated whenever the voltage appearing across gap 36 drops below 80 percent of the ideal voltage.

The output of gate 83 is supplied to resettable counter 87. Resettable counter 87 is used to count the number of pulses upon which the voltage across the gap 36 is less than the second predetermined value. The count displayed by resettable counter 87 is used to indicate or count the number of pulses at which steady state arcing or burning of the workpiece occurs. This counter may be reset after the machining of each workpiece. Therefore, the EDM operator may be informed of the amount of arcing occurring during the machining of the workpiece without having to visually observe the gap between the electrode and the workpiece.

The output of gate 85 is applied to resettable counter 89. Resettable counter 89 provides a count of the number of pulses upon which the voltage across gap 36 is less than a third predetermined voltage supplied by adjustable reference voltage means 80. The count indicated by resettable counter 89 is used as an indication of incipient arcing.

Referring to FIG. 2, there is shown a portion of the circuitry of FIG. 1 which is shown in dotted outline in FIG. 1. The output of the Schmitt trigger 42 is applied to lead 86. A bank of capacitors 88 comprised of capacitors 89–91 is connected to lead 86. One of the capacitors of capacitor bank 88 is selected by means of switch 92 depending upon the frequency range of operation of the electrical discharge machine power supply.

Assuming that the output of Schmitt trigger 42 is a positive voltage pulse, a fixed quantity of charge is applied to capacitor 94 via capacitor bank 88, switch 92 and diode 96 during each positive pulse. In between pulses, the capacitor of capacitor bank 88 selected by switch 92 is recharged via diode 98. The charge across capacitor 94 is applied across meter 50 through resistor 102 and a portion of potentiometer 104. Diode 106 is a protective diode for the meter movement of meter 50. That is, the forward conducting voltage across a diode may be as high as 0.6 to 0.7 of a volt. If the meter movement of meter 50 is a 50 microampere meter movement, by the proper selection of values for resistor 102 and potentiometer 104, diode 106 will commence to conduct as the current through the meter movement of meter 50 exceeds the 50 microampere full scale deflection limit.

In operation, the wiper arm of potentiometer 104 is adjusted to cause meter 50 to read full scale or 100 percent when switch 30 is switched so as to connect the input of Schmitt trigger 42 to the voltage pulses appearing across gap 36. The output to analog to digital converter 72 may be taken across the terminals of meter 50.

Although analog to digital converters 68 and 70 and digital multipliers 70 and 100 have been disclosed as a means of digitally multiplying together the signals, it is not necessary to provide this digital multiplication. In order to produce an electrical discharge machine efficiency monitoring system at a reduced cost, the multiplication may be done manually. That is, the frequency may be read from frequency meter 44, the percentage of pulses upon which conduction occurs may be read from meter 50 and the charge or energy may be read from meter 66. These readings may be multiplied together manually in order to obtain an indication of the metal removal rate. This product so obtained may be referred to a chart which will give the actual metal removal rate for the particular metal being machined, the particular type of electrode, and the polarity connection to the electrode 14 and workpiece 16. Furthermore, switch 30 may be switched to contacts 26, 28 and the frequency of pulses crossing the gap may be monitored on frequency meter 44. It would then only be necessary to multiply the frequency obtained on frequency meter 44 by the charge per pulse indicated on meter 66 in order to obtain an indication of the metal removal rate. Assuming that meter 50 was first calibrated by means of calibration circuit 46 with respect to the actual frequency of pulses supplied by power supply 10, the meter 50 will read the percentage of pulses crossing the gap which may in itself provide an indication of the efficiency of machining operation. That is, the higher the percentage of pulses supplied by power supply 10 upon which conduction across gap 36 occurs, the higher will be the actual efficiency of the electrical discharge machining operation.

It will be apparent to those skilled in the art that various modifications may be made to the efficiency monitoring system described herein. For example, as mentioned above, various other types of pulsing circuits having the characteristics of a Schmitt trigger may be substituted for Schmitt trigger circuit 42. In addition, although digital multiplication is disclosed, it is obvious that analog multiplication may be used. Also, various other types of transducers may be used in place of transducer 20. Although meters are shown in some instances, these may be replaced with digital readout means.

In view of the foregoing, the present invention may be embodied in other specific forms without departing from the spirit or essential attributes thereof and, accordingly, reference should be made to the appended claims, rather than to the foregoing specification as indicating the scope of the invention.

I claim:

1. Apparatus for monitoring the efficiency of an electrical discharge machining operation in which pulses of electrical energy are applied to an electrode through a lead, said electrode being spaced from a work piece to form a gap between said electrode and said work piece, comprising:

transducer means coupled to said lead, said transducer providing an output in response to current flow through said leads;

electrical connections connected across said gap to provide an output to enable measurement of gap voltage;

gating means connected to said output of said transducer means, said gating means passing the output of said transducer only when an output is provided by said transducer in response to current flow through said leads;

integrating means for integrating the output of said transducer passed by said gating means and providing an output;

means for indicating the value of the output of said integrating means;

a switch means for selecting either the output of said transducer means or the output of said electrical connections;

a frequency meter, said frequency meter receiving a signal from said switch means, said frequency meter indicating the frequency of the pulses of electrical energy applied to said electrode when the switch means is selecting the output of said electrical connections;

a calibration means, said calibration means receiving a signal from said switch means; and an indicator means, said calibration means being adjustable to cause said indicator means to read a predetermined value corresponding to 100 percent when said switch means is selecting the output of said electrical connections, said indicator means indicating the percentage of pulses of electrical energy applied to said electrode upon which conduction across said gap occurs, whereby the electrical charge measurement, the frequency indicated by said frequency meter and the percentage indicated by said indicator means may be multiplied together to obtain an indication of the efficiency of the electrical discharge machining operation.

2. Apparatus in accordance with claim 1 including means for multiplying together the electrical charge measurement, frequency indicated by said frequency meter and percentage indicated by said indicator means and means for indicating the product of said multiplication.

3. Apparatus in accordance with claim 1 including a switch operated by said indicating means when said indicating means indicates a percentage below a predetermined percentage, and an alarm actuated in response to operation of said switch.

4. Apparatus in accordance with claim 1 including means to compare the magnitude of the voltage of the electrical energy pulse appearing at the output of said electrical connections connected across said gap with a predetermined voltage only during periods of conduction across said gap and providing an output only if the magnitude of the electrical voltage pulse across said gap is less than the predetermined voltage during said periods of conduction.

5. Apparatus in accordance with claim 1 including a Schmitt trigger circuit for receiving the output of said switch means, said Schmitt trigger circuit providing a shaped output pulse to said frequency meter and said calibration means.

6. Apparatus for monitoring the efficiency of an electrical discharge machining operation in which electrical voltage pulses are applied across a gap formed between an electrode and a work piece, comprising:
   means for monitoring the pulse voltage applied across said gap, said monitoring means having an output at which appears a pulse for each voltage pulse applied across said gap;
   means for detecting current flow through said electrode in response to conduction across said gap, said current detecting means producing an output pulse in response to each voltage pulse applied across said gap upon which conduction occurs;
   means to select the output of said monitoring means or said current detection means;
   calibration means, said calibration means receiving the selected output of said selector means, said calibration means including means to adjust the signal level output of said calibration means; and
   indicator means, said indicator means receiving the output of said calibration means and providing a percentage indication in response to the signal received from said calibration means, said indicator means being caused to read a predetermined value corresponding to a maximum by adjustment of said adjusting means of said calibration means when said selector means is selecting the output of said monitoring means, and said indicator means reading a value equal to or less than said predetermined value when said selector means is selecting the output of said current detection means to indicate the efficiency of the machining operation in terms of percentage of electrical voltage pulse upon which machining occurs.

7. Apparatus in accordance with claim 6 including means to compare the magnitude of the output of said monitoring means with a first, a second and a third predetermined voltage, respectively, means to gate the output of said comparator means only during periods of conduction across said gap, means to provide an alarm if the output of said monitoring means is less than said first predetermined voltage, means for counting the number of times the output of said monitoring means is less than said second predetermined voltage in order to provide an indication of the steady state arcing condition, and means to count the number of times the output of said monitoring means is less than said third predetermined voltage in order to provide an indication of the incipient arcing condition.

8. Apparatus for monitoring the efficiency of an electrical discharge machining operation in which electrical voltage pulses are applied across a gap formed between an electrode and a work piece, comprising:
   means for measuring the electrical charge flowing across said gap during each electrical voltage pulse, said electrical charge measuring means including transducer means for producing an output responsive to current flow to said electrode, means for gating the output of said transducer only during periods of current flow to said electrode, and integrator means for integrating the gated transducer output from said gating means to produce an output signal proportional to the integrated value of current flow to said electrode; and
   means for measuring the actual number of pulses per unit of time in which conduction across said gap occurs whereby the electrical charge measurement may be multiplied by the number of pulses per unit time measurement in order to obtain an indication of the metal removal rate efficiency of the electrical discharge machining operation.

9. Apparatus in accordance with claim 8 including means for detecting a predetermined percentage decrease in magnitude of the voltage pulse appearing across said gap.

10. Apparatus in accordance with claim 8 including indicator means for indicating the value of the output of said integrator means.

11. Apparatus in accordance with claim 10 wherein said indicator means is a meter.

12. Apparatus for monitoring the efficiency of an electrical discharge machining operation in which electrical voltage pulses are applied across a gap formed between an electrode and a work piece, comprising:
   means for measuring the electrical charge flowing across said gap during each electrical voltage pulse; and
   means for measuring the actual number of pulses per unit of time in which conduction across said gap occurs, said measuring means including transducer means for producing an output in response to current flow to said electrode, means for producing a single output pulse in response to each output pulse of said transducer means and a frequency meter for counting the output pulses of said pulse producing means whereby the electrical charge measurement may be multiplied by the number of pulses per unit time measurement in order to obtain an indication of the metal removal rate efficiency of the electrical discharge machining operation.

13. Apparatus for monitoring the efficiency of an electrical discharge machining operation in which pulses of electrical energy are applied to an electrode through a conductor, said electrode being spaced from a work piece to form a gap between said electrode and said work piece, comprising:
   means for measuring the electrical charge flowing across said gap during each electrical energy pulse, said electrical charge measuring means including transducer means for producing an output responsive to current flow to said electrode, means for gating the output of said transducer only during periods of current flow to said electrode and integrator means for integrating the transducer output of said gating means to produce a signal proportional to the energy flow to said electrode during each current pulse to said electrode;
   means for measuring the rate at which pulses of electrical energy are applied to said electrode; and means for measuring the percentage of pulses of electrical energy applied across said gap upon which conduction across said gap occurs whereby the electrical charge measurement, the pulse rate measurement and the percentage on which conduction occurs measurement may be multiplied in order to obtain an indication of the efficiency of the electrical discharge machining operation.

14. Apparatus in accordance with claim 13 including indicator means for indicating the value of the output of said integrator means.

15. Apparatus in accordance with claim 13 including means to compare the magnitude of the voltage of the electrical energy pulse across said gap with a predetermined voltage and providing an output only if the magnitude of the electrical voltage pulse across said gap is less than the predetermined voltage during periods of conduction across said gap.

16. Apparatus in accordance with claim 14 wherein said indicator means is a meter.

17. Apparatus in accordance with claim 13 including means for multiplying together the electrical charge measurement, the pulse rate measurement and the percentage on which conduction occurs measurement and means for indicating the product of said multiplication.

* * * * *